(12) United States Patent
Biggs et al.

(10) Patent No.: US 10,408,287 B2
(45) Date of Patent: Sep. 10, 2019

(54) METHOD AND APPARATUS FOR SAFE GEAR RATIO SELECTION AND CONTROL FOR A CLUTCH-TO-CLUTCH TRANSMISSION

(71) Applicant: GM Global Technology Operations LLC, Detroit, MI (US)

(72) Inventors: Scott D. Biggs, Milford, MI (US); Ronald F. Lochocki, Jr., Ypsilanti, MI (US); Brian W. Hanselman, Milford, MI (US); Greg J. Perantoni, Milford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 267 days.

(21) Appl. No.: 15/590,433

(22) Filed: May 9, 2017

(65) Prior Publication Data

US 2018/0328421 A1 Nov. 15, 2018

(51) Int. Cl.
*F16D 48/06* (2006.01)
*F16H 61/12* (2010.01)
(Continued)

(52) U.S. Cl.
CPC ......... *F16D 48/062* (2013.01); *B60W 10/113* (2013.01); *B60W 10/115* (2013.01); *F16H 59/68* (2013.01); *F16H 61/12* (2013.01); *F16H 61/16* (2013.01); *F16H 61/684* (2013.01); *F16H 2061/064* (2013.01); *F16H 2061/1208* (2013.01); *F16H 2061/1232* (2013.01)

(58) Field of Classification Search
CPC .................. F16D 48/062; F16H 59/68; F16H 2059/6807; F16H 2059/6815; F16H 61/684; F16H 61/686; F16H 61/688; F16H 2061/064; F16H 61/12; F16H 61/16; F16H 2061/1208; F16H 2061/1232; F16H 2061/1236; B60W 10/113; B60W 10/115; B60W 2050/021
See application file for complete search history.

(56) References Cited

U.S. PATENT DOCUMENTS 5,113,720 A * 5/1992 Asayama ............ F16H 61/0206
477/154
5,472,389 A * 12/1995 Ando .................... F16H 61/061
475/116

(Continued)

*Primary Examiner* — Jacob S. Scott
*Assistant Examiner* — Lori Wu

(57) ABSTRACT

A clutch-to-clutch transmission monitoring system for an automobile vehicle includes a control software generating a control signal. A monitor is in communication with the control software. A pre-compute monitor is in communication with the control software. The pre-compute monitor also receives the input data and outputs an operating threshold signal to the control software. The operating threshold signal defines allowed operating bounds for at least one component in communication with the monitor. A post-compute monitor is in communication with both the control software and the pre-compute monitor. The post-compute monitor receives both the control signal and the operating threshold signal. The post-compute monitor compares the control signal to the operating threshold signal to identify if the control signal violates the allowed operating bounds defined by the pre-compute monitor.

19 Claims, 3 Drawing Sheets

(51) Int. Cl.
*F16H 61/16* (2006.01)
*F16H 59/68* (2006.01)
*B60W 10/113* (2012.01)
*B60W 10/115* (2012.01)
*F16H 61/684* (2006.01)
*F16H 61/06* (2006.01)

(56) References Cited

U.S. PATENT DOCUMENTS

| | | | | |
|---|---|---|---|---|
| 5,611,245 | A * | 3/1997 | McKee | B60W 10/02 |
| | | | | 192/3.63 |
| 8,328,685 | B2 * | 12/2012 | Mayhew | F16H 61/061 |
| | | | | 477/70 |
| 2002/0156562 | A1 * | 10/2002 | Berger | F16H 59/70 |
| | | | | 701/55 |
| 2009/0112418 | A1 * | 4/2009 | Buur | B60K 6/445 |
| | | | | 701/55 |
| 2009/0112420 | A1 * | 4/2009 | Buur | F16H 59/105 |
| | | | | 701/56 |
| 2012/0297913 | A1 * | 11/2012 | Biallas | F16H 61/16 |
| | | | | 74/473.21 |
| 2014/0336864 | A1 * | 11/2014 | Yoshida | B60W 50/0205 |
| | | | | 701/29.2 |
| 2016/0125670 | A1 * | 5/2016 | Amano | B60K 6/387 |
| | | | | 701/22 |

* cited by examiner

METHOD AND APPARATUS FOR SAFE GEAR RATIO SELECTION AND CONTROL FOR A CLUTCH-TO-CLUTCH TRANSMISSION

INTRODUCTION

The present disclosure relates to automobile vehicle clutch-to-clutch transmission control systems.

Automatic transmission designs including auto-planetary gear transmissions and dual clutch transmissions, hereinafter "clutch-to-clutch" transmissions, provide control software to control features including sequencing control, clutch pressure control, diagnostics, and the like. A control software (SW) is in direct communication with a hardware inputs and outputs (HWIO) module. In recent transmission designs, a software (SW) monitor has been added in parallel with the control (SW) and the HWIO module. The purpose of the SW monitor is to police the output command signals from the control software (SW) to prevent a too low gear being commanded such as commanding a gear change from eighth gear to first gear, commanding on too many clutches, or commanding a clutch combination that would result in a transmission output shaft tie-up, such as commanding a forward clutch in combination with a reverse clutch.

A hazard such as an unintended deceleration (UD) or an unintended direction including an unintended acceleration may be possible if the control software (SW) which controls transmission operation is corrupted or has erroneous calibrations or algorithm flaws. Current transmission designs set a code when predetermined hazard criteria are met. The transmission controls set a transmission safe condition which can result in forcing the transmission into mechanical-hydraulic fault and setting an engine hazard warning. Such results may leave a motorist without the capability to enter a drive gear command.

Thus, while current software control monitors achieve their intended purpose, there is a need for a new and improved system and method for controlling automatic transmissions.

SUMMARY

According to several aspects, a clutch-to-clutch transmission monitoring system for an automobile vehicle includes a control software generating a control signal. A monitor is in communication with the control software. A pre-compute monitor is in communication with the control software. The pre-compute monitor also receives the input data and outputs an operating threshold signal to the control software. The operating threshold signal defines allowed operating bounds for at least one component in communication with the monitor. A post-compute monitor is in communication with both the control software and the pre-compute monitor. The post-compute monitor receives both the control signal and the operating threshold signal. The post-compute monitor compares the control signal to the operating threshold signal to identify if the control signal violates the allowed operating bounds defined by the pre-compute monitor.

In another aspect of the present disclosure, a fail timer is initiated by the post-compute monitor when the control signal violates the allowed operating bounds defined by the pre-compute monitor.

In another aspect of the present disclosure, a hardware inputs and outputs (HWIO) module receives the control signal and performs control functions for the at least one component in communication with the monitor and further in communication with the fail timer.

In another aspect of the present disclosure, following a predetermined period of time of operation of the fail timer the post-compute monitor issues a fail command to the HWIO module to cease operation of the at least one component.

In another aspect of the present disclosure, the monitor defines a command shift monitor monitoring for an unintended vehicle deceleration due to an engine over speed caused by achieving a gear that is too low for a current vehicle speed.

In another aspect of the present disclosure, the pre-compute monitor determines allowed operating thresholds of a lowest allowed gear based on a driver request and incorporates the allowed operating thresholds when generating the operating threshold signal.

In another aspect of the present disclosure, the monitor defines a ratio monitor monitoring for an incorrect direction of the vehicle as the vehicle begins to move from a stopped position.

In another aspect of the present disclosure, the pre-compute monitor validates the transmission is configuring for either reverse or forward through the use of a calculated signed ratio.

In another aspect of the present disclosure, the monitor defines a tie-up monitor monitoring for an unintended vehicle deceleration due to extra clutches being commanded on when they should be off.

In another aspect of the present disclosure, if the transmission defines an auto-planetary transmission, the pre-compute monitor identifies if any normally OFF clutches for a desired gear are indicating ON, indicating a tie-up condition is present; or if the transmission defines a dual clutch transmission, the pre-compute monitor confirms that each of two clutches are not both on all the time.

In another aspect of the present disclosure, the monitor defines a range monitor monitoring for an incorrect vehicle direction command.

In another aspect of the present disclosure, the pre-compute monitor identifies allowed clutch combinations based on a PRNDL (park-reverse-neutral-drive-low command) position via clutch connectivity detection.

According to several aspects, a clutch-to-clutch transmission monitoring system for an automobile vehicle includes a control software receiving input data from multiple systems of an automobile vehicle and generating a control signal. A monitor is in communication with the control software. A pre-compute monitor is in communication with the control software, the pre-compute monitor also receiving the input data and outputting an operating threshold signal to the control software. The operating threshold signal defines allowed operating bounds for at least one transmission component in communication with the monitor. A post-compute monitor receives both the control signal and the operating threshold signal. The post-compute monitor compares the control signal to the operating threshold signal to identify if the control signal violates the allowed operating bounds defined by the pre-compute monitor. A fail timer is initiated by the post-compute monitor when the control signal violates the allowed operating bounds defined by the pre-compute monitor.

In another aspect of the present disclosure, software checks added to the control SW determine the thresholds identified by the operating threshold signal determined by the pre-compute monitor are not violated.

In another aspect of the present disclosure, the pre-compute monitor includes a calibration monitor for performing vehicle speed and allowable gear calculations.

In another aspect of the present disclosure, a memory is included, wherein calculations performed in the calibration monitor of the pre-compute monitor are saved in the memory.

In another aspect of the present disclosure, the monitor includes one of a command shift monitor, a ratio monitor, a tie-up monitor, and a range monitor.

According to several aspects, a clutch-to-clutch transmission monitoring system for an automobile includes a control software receiving input data from multiple systems of an automobile vehicle and generating a control signal. A monitor is in communication with the control software. A pre-compute monitor is in communication with the control software. The pre-compute monitor also receives the input data and outputs an operating threshold signal to the control software. The operating threshold signal defines allowed operating bounds for at least one transmission component in communication with the monitor. A post-compute monitor receives both the control signal and the operating threshold signal. The post-compute monitor compares the control signal to the operating threshold signal to identify if the control signal violates the allowed operating bounds defined by the pre-compute monitor. A fail timer is initiated by the post-compute monitor when the control signal violates the allowed operating bounds. A hardware inputs and outputs (HWIO) module in communication with the fail timer opens drivers to multiple clutches when a fail signal is generated by the post-compute monitor following a predetermined period of time of operation of the fail timer.

In another aspect of the present disclosure, a calibration monitor performs vehicle speed and allowable gear calculations. A memory is provided, having calculations performed in the calibration monitor saved in the memory.

In another aspect of the present disclosure, the calibration monitor is included with the pre-compute monitor.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
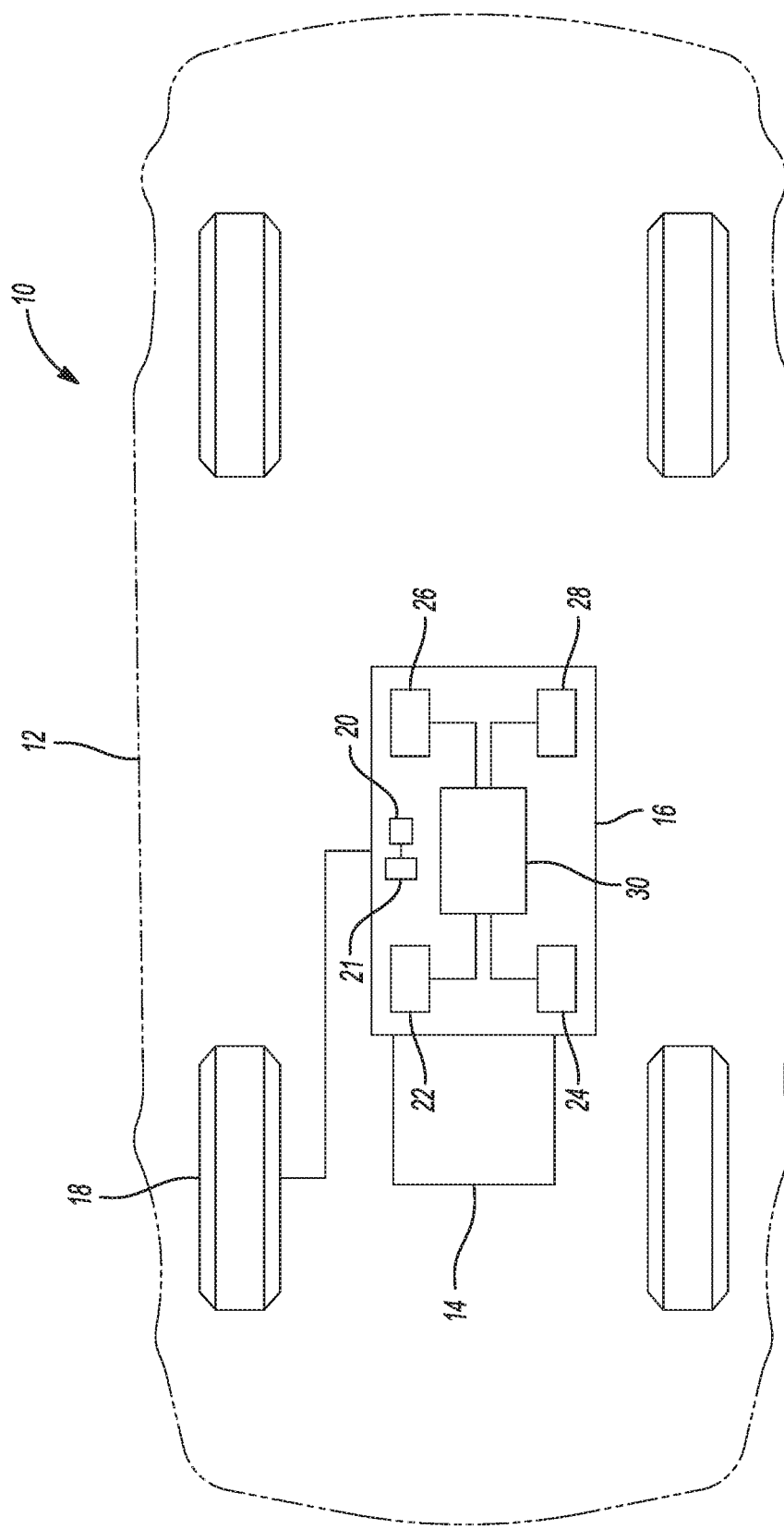
FIG. 1 is a flow diagram of a clutch-to-clutch transmission monitoring system according to an exemplary embodiment.

Referring to FIG. 1, high level control features of a clutch-to-clutch transmission monitoring system 10 provides multiple monitoring functions for an automobile vehicle 12 having a prime mover 14 such as an engine connected to a transmission 16 providing propulsion power to at least one driven wheel 18. The transmission 16 may be a clutch-to-clutch transmission such as a dual clutch transmission or an auto-planetary transmission. The transmission 16 may include multiple clutches 20 with at least one clutch on to engage a gear. For example an auto-planetary transmission may include five clutches that operate in groups of three on or pressurized clutches to achieve an intended gear ratio in forward and at least one gear ratio in reverse. Each of the clutches 20 is individually commanded using a solenoid actuated driver, defining high and low side drivers 21. Power to the drivers 21 may be shut off under certain conditions defined herein, which protects the transmission 16 by forcing the transmission into mechanical-hydraulic fault.

The monitoring functions of monitoring system 10 include multiple monitors including a command shift monitor 22, a ratio monitor 24, a tie-up monitor 26, and a range monitor 28. The command shift monitor 22 protects against by monitoring for an unintended vehicle deceleration due to an engine over speed specifically caused by achieving a gear that is too low for a current vehicle speed. Such a condition would back-drive the engine to a very high unsafe speed. The ratio monitor 24 protects against by monitoring for an incorrect direction as seen by a sign of a measured ratio as the vehicle 12 begins to move from a stopped position. The tie-up monitor 26 protects against by monitoring for an unintended vehicle deceleration due to extra clutches being commanded on when they should be off, as seen by a configuration of the clutches given by clutch pressure commands. The range monitor 28 protects against an incorrect vehicle direction command as seen by the configuration of the clutches as given by clutch pressure commands.

Each of the monitors 22, 24, 26, 28 receives inputs including but not limited to commanded range, shift state enumerations, commanded gear, brake position, clutch pressures, clutch fill states, vehicle speed, and the like. Each of the monitors produce one or more signals defining remedial actions based on the inputs and the vehicle state. The monitors are also in communication with a control software (SW) 30 which produces command signals based on the inputs.

In order to provide additional assurance that the remedial actions directed by each of the monitors incorporates allowed thresholds for a current vehicle state prior to a control signal being generated, and that the command or control signal from each of the monitors is not based on corrupted data due to for example a computational error or a memory error, monitoring system 10 incorporates each of a pre-compute monitor and a post compute monitor for data entering and commands output from the control SW 30 for each of the command shift monitor 22, the ratio monitor 24, the tie-up monitor 26, and the range monitor 28.

Referring to FIG. 2 and again to FIG. 1, monitoring features used for the command shift monitor 22 include a first or pre-compute monitor 32 and a second or post-compute monitor 34. Input data 36 includes but is not limited to vehicle speed which is communicated via an input communication path 38 to the control SW 30. The pre-compute monitor 32 also looks at speed sensor diagnostics, high side driver states, and service states. Normal control functions of the control SW 30 include sequencing control, clutch pressure control, diagnostics, and the like. At the same time the input data 36 is communicated via the input communication path 38, at least a portion of the input data 36 is also communicated as input communication data 40 to the pre-compute monitor 32.

The pre-compute monitor 32 runs after all of the vehicle states, speeds, driver requests, and the like are known. For example the pre-compute monitor 32 provides a calibration monitor 42 for performing vehicle speed and allowable gear calculations. For example, the calibration monitor 42 computes a lowest allowed gear by identifying a gear limit if the vehicle speed is above a predetermined threshold. As a first software monitoring function for the command shift monitor 22, the pre-compute monitor 32 determines allowed operating thresholds of the lowest allowed gear based on a driver request (i.e. range) and publishes this in an operating threshold signal 44 which is communicated to each of the control SW 30 and to the post-compute monitor 34. The operating threshold signal 44 indicates allowed thresholds or operating bounds for a current vehicle state.

Exemplary thresholds or operating bounds identified by the operating threshold signal 44 may include limiting transmission gear changes. Such changes may for example limit reduction from a predetermined gear such as during operation at highway speed in a high gear such as eighth gear to any gear below second gear. Limits can also include policing against bad ratio changes that may be induced by a corruption in the computer code, an electronic pulse that creates corrupted code, and the like.

In addition to normal functions of the control SW 30, additional software checks are added to the functions of the control SW 30. The additional software checks determine that the thresholds identified by the operating threshold signal 44 which were determined by the pre-compute monitor 32 are not violated. Following performance of normal controller functions plus performance of the additional software checks noted above, a control signal 46 is generated and communicated from the control SW 30 to a hardware inputs & outputs module (HWIO) module 48 and also to the post-compute monitor 34. The post-compute monitor 34 therefore receives two inputs, the first input being the operating threshold signal 44 generated by the pre-compute monitor 32 which is the same signal input to the control SW 30, and the second input being the control signal 46 output from the control SW 30.

As a second software monitoring function of the monitoring system 10 for the command shift monitor 22, the post-compute monitor 34 observes the control signal 46 output from the control SW 30 and compares the control signal 46 against the allowed operating bounds provided with the operating threshold signal 44 from the pre-compute monitor 32. Normally, it is anticipated that at least 99% or greater of the control signals 46 communicated from the control SW 30 will be within the operating bounds identified with the operating threshold signal 44 produced by the pre-compute monitor 32. Most control signals 46 generated by the control SW 30 will therefore be determined by the post-compute monitor 34 to be within the operating bounds as they pass to the HWIO module 48.

If the post-compute monitor 34 observes that a controls output provided with the control signal 46 violates any of the allowed operating bounds identified with the operating threshold signal 44 from the pre-compute monitor 32, a fail timer 50 starts. The post-compute monitor 34 does not directly interfere with the control signal 46 prior to passage to the HWIO module 48, but continuously performs a check of the control signal 46 that is output from the control SW 30 to identify if the control signal 46 is within the allowed operating bounds.

Ultimately, if the fail timer 50 indicates a predetermined fail time has accumulated, such as for example a predicted hazard condition such as an improper shift command that continues for 200 milliseconds or more, a fail signal 52 is generated and forwarded from the post-compute monitor 34 to the HWIO module 48 which acts similar to known transmission control systems to set a predetermined transmission safe condition, by for example pulling power to the high side clutch solenoid drivers. It is anticipated that the fail signal 52 when generated will be due to a computational problem that is not part of the software, such as corruptions in the data or a memory problem.

Calculations performed in the pre-compute monitor 32 are also saved in a memory 54. Data saved in the memory 54 can therefore be accessed for subsequent loops of the program.

Figure 2:
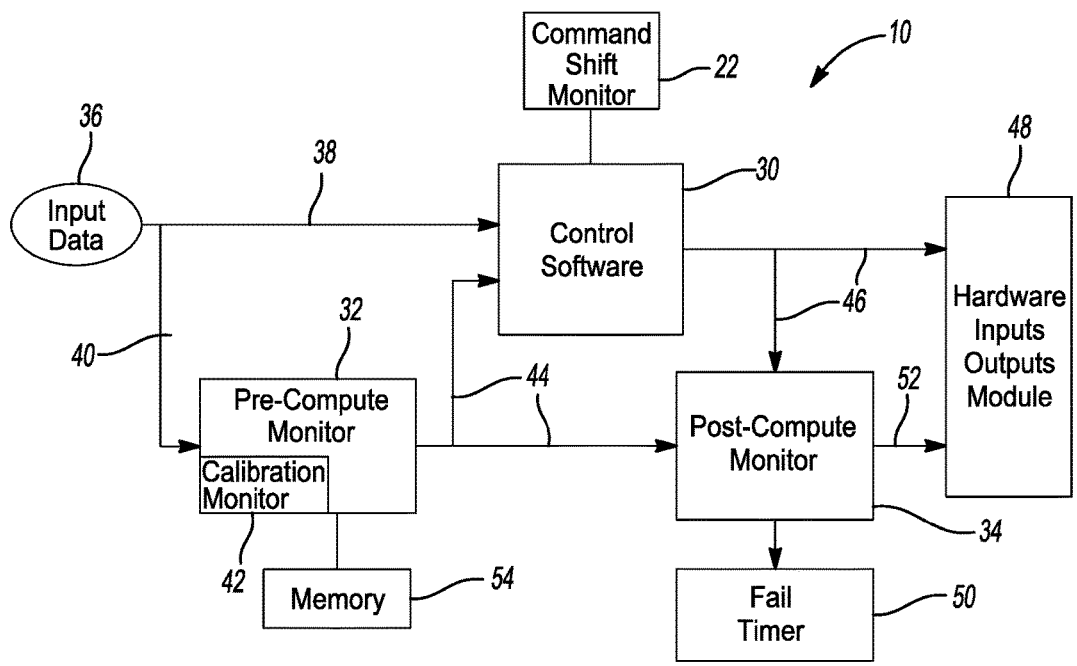
FIG. 2 is a flow diagram providing a pre-compute monitor and a post-compute monitor in conjunction with a command shift monitor according to an exemplary embodiment.

Referring to FIG. 3 and again to FIGS. 1 and 2, the monitoring features used for the ratio monitor 24 include a first or pre-compute monitor 56 and a second or post-compute monitor 58. Input data 60 includes but is not limited to signed transmission input speed (TIS) and transmission output speed (TOS), clutch slips, engine speed, and PRNDL position, which are communicated via an input communication path 62 to the control SW 30. The pre-compute monitor 56 also analyzes speed sensor diagnostics, high side driver states, and service states. The expected direction is given by the PRNDL position.

At the same time the input data 60 is communicated via the input communication path 62 to the control SW 30, at least a portion of the input data 60 is also communicated as input communication data 64 to the pre-compute monitor 56. As a first software monitoring function for the ratio monitor 24, the pre-compute monitor 56 validates the transmission 16 is configuring for either reverse or forward through the use of a calculated signed ratio, expected clutch slips, and ratio binning. For example a binning quantity of x.5 is drive 1 and x.9 is reverse so these unique numbers also divulge the direction versus a neutral state. The pre-compute monitor 56 further validates the transmission 16 is configuring for either reverse or forward through the use of torque converter speed ratio, to determine if torque is being transmitted, and vehicle speed. The pre-compute monitor 56 publishes this in an operating threshold signal 66 which is communicated to each of the control SW 30 and to the post-compute monitor 58. The operating threshold signal 66 indicates allowed thresholds or operating bounds for a current vehicle state.

Additional software checks added to the control SW 30 determine that the thresholds identified by the operating threshold signal 66 which were determined by the pre-compute monitor 56 are not violated. Following performance of normal controller functions plus performance of the additional software checks noted above, a control signal 68 is generated and communicated from the control SW 30 to the hardware inputs & outputs (HWIO) module 48 and also to the post-compute monitor 58. The post-compute monitor 58 therefore receives two inputs, the first input being the operating threshold signal 66 generated by the pre-compute monitor 56 which is the same signal input to the control SW 30, and the second input being the control signal 68 output from the control SW 30.

As a second software monitoring function of the monitoring system 10 for the ratio monitor 24, the post-compute monitor 58 observes the control signal 68 output from the control SW 30 and compares the control signal 68 against the allowed operating bounds provided with the operating threshold signal 66 from the pre-compute monitor 56. The post-compute monitor 58 identifies if a shift is less than the time allowed by an overall hazard or fail timer 70, for example 500 msec. If the shift is lingering as it could when the transmission 16 is cold, or in a condition that to the post-compute monitor 58 appears to not match the driver intended direction indicated by the PRNDL command, such as a negative ratio when the driver is commanding forward, and within the first 150 to 300 msec, the post-compute monitor 58 forces the controls to end the shift by bringing on the oncoming clutch "suddenly" and then assessing the ratio, either forward or reverse. If the shift is lingering but the ratio is of the correct sign, no action is taken. If the post-compute monitor 58 observes a wrong direction ratio the post-compute monitor 58 sends a fail signal 72 to the HWIO module 48 to pull the clutch high side drivers at the 500 msec point. Also, if the post-compute monitor 58 observes the total shift time extends beyond the predetermined maximum 500 msec point indicated by the fail timer 70, and the determined direction via ratio binning or clutch slip, or the like, does not match the driver command after the shift is commanded to conclude, the post-compute monitor 58 sends the fail signal 72 to the HWIO module 48 to pull power to the clutch high side drivers. It is anticipated that the fail signal 72 when generated will be due to a computational problem that is not part of the software, such as corruptions in the data or a memory problem.

The post-compute monitor 58 does not directly interfere with the control signal 68 prior to passage to the HWIO module 48, but continuously performs a check of the control signal 68 that is output from the control SW 30 to determine that the control signal 68 is within the allowed operating bounds.

Figure 3:
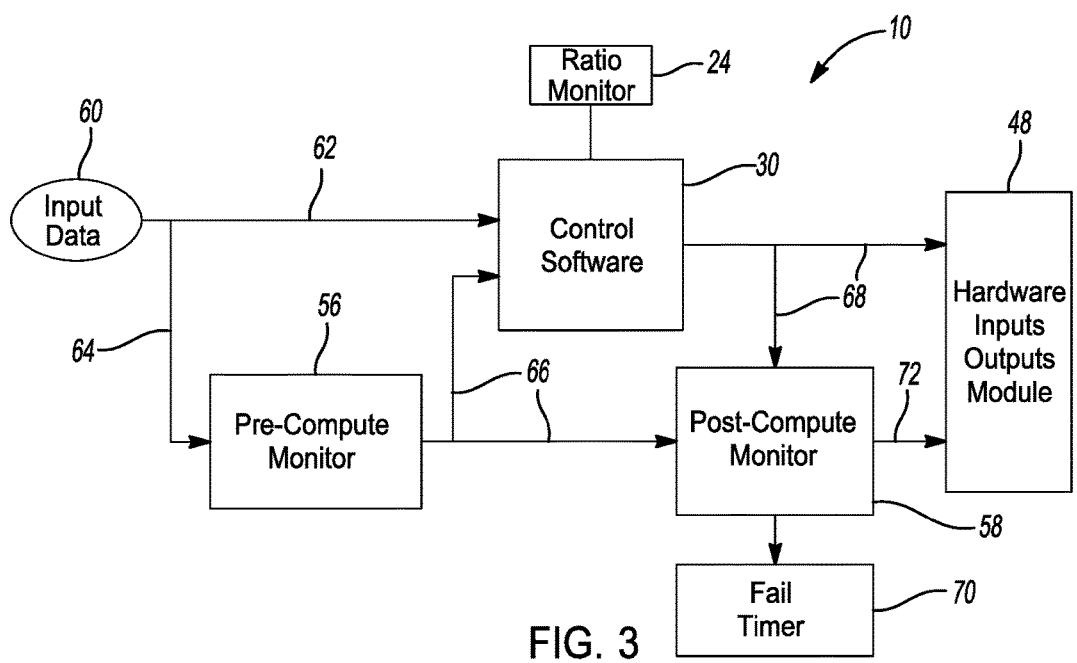
FIG. 3 is a flow diagram providing a pre-compute monitor and a post-compute monitor in conjunction with a ratio monitor according to an exemplary embodiment.
Figure 4:
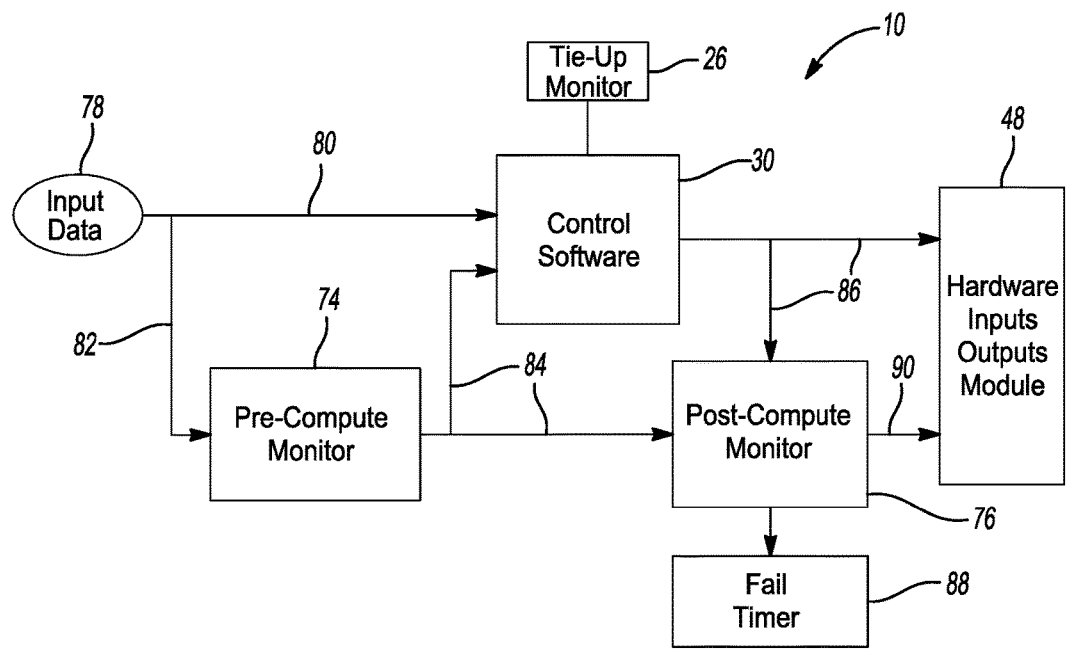
FIG. 4 is a flow diagram providing a pre-compute monitor and a post-compute monitor in conjunction with a tie-up monitor according to an exemplary embodiment.

Referring to FIG. 4 and again to FIGS. 1 through 3, the monitoring features used for the tie-up monitor 26 include a first or pre-compute monitor 74 and a second or post-compute monitor 76. Input data 78 includes but is not limited to PRNDL position, commanded gear, and attained gear, which are communicated via an input communication path 80 to the control SW 30. The pre-compute monitor 74 also looks at a fill percentage of a clutch, return spring pressure which indicate clutch plates are touching, TOS as an indicator that a deceleration is occurring, diagnostics, and service checks. The expected direction is given by the PRNDL position.

At the same time the input data 78 is communicated via the input communication path 80, a portion of the input data 78 is also communicated as input communication data 82 to the pre-compute monitor 74. As a first software monitoring function for the tie-up monitor 26, the pre-compute monitor 74 identifies if the normally OFF clutch or clutches for the desired gear are indicating ON, indicating a tie-up or seized gearbox condition is present. The normally OFF clutch or clutches must be above a predetermined threshold expected to cause a tie-up or deceleration above a predetermined threshold. In a dual clutch transmission, the pre-compute monitor 74 confirms that both clutches are not both on all the time. In either of these conditions, the pre-compute monitor 74 publishes this in an operating threshold signal 84 which is communicated to each of the control SW 30 and to the post-compute monitor 76. The operating threshold signal 84 indicates allowed thresholds or operating bounds for a current vehicle state.

Additional software checks added to the control SW 30 determine that the thresholds identified by the operating threshold signal 84 which were determined by the pre-compute monitor 74 are not violated. Following performance of normal controller functions plus performance of the additional software checks noted above, a control signal 86 is generated and communicated from the control SW 30 to the hardware inputs & outputs (HWIO) module 48 and also to the post-compute monitor 76. The post-compute monitor 76 therefore receives two inputs, the first input being the operating threshold signal 84 generated by the pre-compute monitor 74 which is the same signal input to the control SW 30, and the second input being the control signal 86 output from the control SW 30.

As a second software monitoring function of the monitoring system 10 for the tie-up monitor 26, the post-compute monitor 76 observes the control signal 86 output from the control SW 30 and compares the control signal 86 against the allowed operating bounds provided with the operating threshold signal 84 from the pre-compute monitor 74. The post-compute monitor 76 checks to confirm if any illegal clutch combinations have been commanded. If the post-compute monitor 76 observes an illegal clutch combination has been commanded the post-compute monitor 76 does not provide feedback to the controls, but initiates a fail timer 88. If the fail timer 88 runs for a predetermined period of time with the illegal clutch combination still being commanded, for example 200 msec, the post-compute monitor 76 sends a fail signal 90 to the HWIO module 48 to pull the clutch high side drivers. It is anticipated that the fail signal 90 when generated will be due to a computational problem that is not part of the software, such as corruptions in the data or a memory problem.

The post-compute monitor 76 does not directly interfere with the control signal 86 prior to passage to the HWIO module 48, but continuously performs a check of the control signal 86 that is output from the control SW 30 to determine that the control signal 86 is within the allowed operating bounds.

Figure 5:
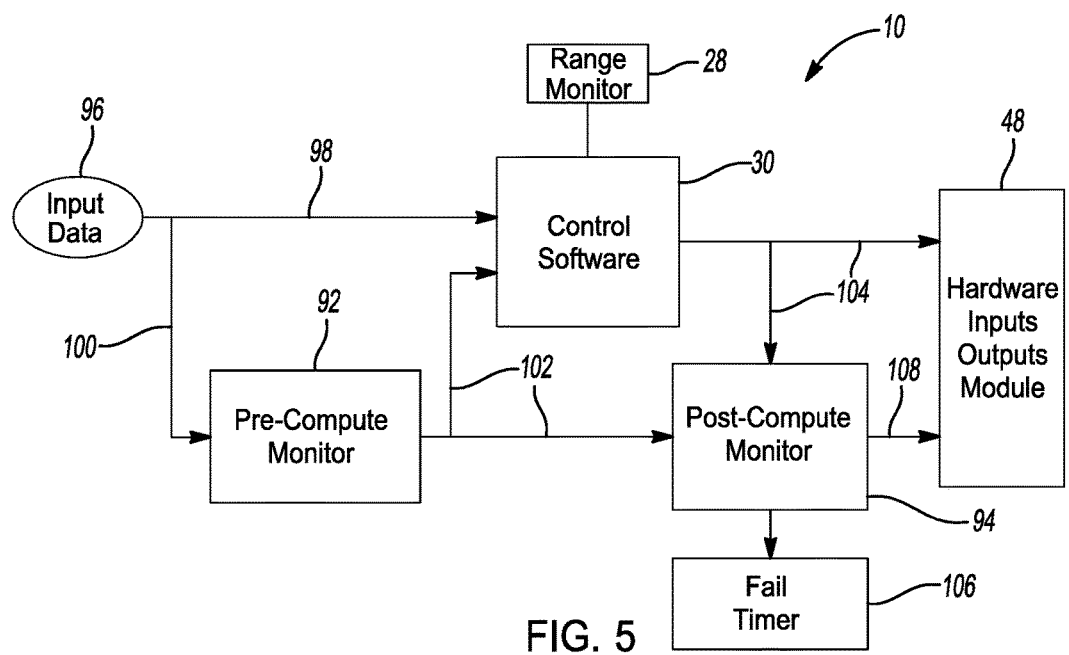
FIG. 5 is a flow diagram providing a pre-compute monitor and a post-compute monitor in conjunction with a range monitor according to an exemplary embodiment.

Referring to FIG. 5 and again to FIGS. 1 through 4, the monitoring features used for the range monitor 28 include a first or pre-compute monitor 92 and a second or post-compute monitor 94. Input data 96 includes but is not limited to the PRNDL position, which is communicated via a first communication path 98 to the control SW 30. The pre-compute monitor 92 also analyzes a fill percentage of a clutch, a return spring pressure which indicate clutch plates are touching, diagnostics, and service checks.

At the same time the input data 96 is communicated via the first communication path 98, a portion of the input data 96 is also communicated as input communication data 100 to the pre-compute monitor 92. As a first software monitoring function for the range monitor 28, the pre-compute monitor 92 identifies allowed clutch combinations based on the PRNDL position via clutch connectivity detection. For example, if the transmission 16 is positioned in drive the allowed clutch combinations cannot result in reverse. The pre-compute monitor 92 publishes the allowed clutch combinations in an operating threshold signal 102 which is communicated to each of the control SW 30 and to the post-compute monitor 94. The operating threshold signal 102 indicates allowed thresholds or operating bounds for the allowed clutch combinations in the current vehicle state.

Additional software checks added to the control SW 30 determine that the thresholds identified by the operating threshold signal 102 which were determined by the pre-compute monitor 92 are not violated. Following performance of normal controller functions plus performance of the additional software checks noted above, a control signal 104 is generated and communicated from the control SW 30 to the hardware inputs & outputs (HWIO) module 48 and also to the post-compute monitor 94. The post-compute monitor 94 therefore receives two inputs, the first input being the operating threshold signal 102 generated by the pre-compute monitor 92 which is the same signal input to the control SW 30, and the second input being the control signal 104 output from the control SW 30.

As a second software monitoring function of the monitoring system 10 for the range monitor 28, the post-compute monitor 94 observes the control signal 104 output from the control SW 30 and compares the control signal 104 against the allowed operating bounds provided with the operating threshold signal 102 from the pre-compute monitor 92. The post-compute monitor 94 checks to confirm if the controls have produced a disallowed clutch combination. If the post-compute monitor 94 observes a disallowed clutch combination has been commanded a hazard is declared indicating the commanded clutch combination is wrong, and the post-compute monitor 94 initiates a fail timer 106. If the fail timer 106 runs for a predetermined period of time with the disallowed clutch combination still being commanded, the post-compute monitor 94 sends a fail signal 108 to the HWIO module 48 to pull the clutch high side drivers. It is anticipated that the fail signal 108 when generated will be due to a computational problem that is not part of the software, such as corruptions in the data or a memory problem.

The post-compute monitor 94 does not directly interfere with the control signal 104 prior to passage to the HWIO module 48, but continuously performs a check of the control signal 104 that is output from the control SW 30 to determine the control signal 104 is within the allowed operating bounds.

The method and system for hazard detection, prevention, and mitigation is employed if a hazard condition is identified. These include a command shift point control identified using the command shift monitor 22, an end-shift command control issued upon an incorrect direction detection as seen by the sign of a measured ratio using the ratio monitor 24, a commanded tie-up if an improper clutch sequencing occurs for a given gear identified using the tie-up monitor 26, and a range control algorithm employed if improper sequencing of a shift occurs which does not match the driver's intent identified using the range monitor 28. An engine overspeed control algorithm is also provided with the command shift monitor 22.

A clutch-to-clutch transmission monitoring system for an automobile vehicle of the present disclosure offers several advantages. These include the use of each of a pre-compute monitor which analyzes input data and sets allowed operating bounds prior to the control SW, and a post-compute monitor which compares the control signals output from the control software against the allowed operating bounds set by the pre-compute monitor. The use of the pre-compute monitor provides the control SW with input related to the vehicle state, while the post-compute monitor provides the capability to identify if a computational error has occurred in the control SW. Data specific to each system monitor can be input to individual ones of multiple pre-compute monitors and a separate post-compute monitor can be assigned to each pre-compute monitor.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A clutch-to-clutch transmission monitoring system for an automobile vehicle, comprising:
    a control software generating a control signal;
    a monitor in communication with the control software;
    a pre-compute monitor in communication with the control software, the pre-compute monitor receiving input data and outputting an operating threshold signal to the control software, the operating threshold signal defining allowed operating bounds for at least one component in communication with the monitor;
    software checks added to the control software determining thresholds identified by the operating threshold signal determined by the pre-compute monitor are not violated; and
    a post-compute monitor in communication with both the control software and the pre-compute monitor, the post-compute monitor receiving both the control signal and the operating threshold signal, the post-compute monitor comparing the control signal to the operating threshold signal to identify if the control signal violates the allowed operating bounds defined by the pre-compute monitor.

2. The clutch-to-clutch transmission monitoring system for an automobile vehicle of claim 1, further including a fail timer initiated by the post-compute monitor when the control signal violates the allowed operating bounds defined by the pre-compute monitor.

3. The clutch-to-clutch transmission monitoring system for an automobile vehicle of claim 2, further including a hardware inputs and outputs (HWIO) module receiving the control signal and performing control functions for the at least one component in communication with the monitor and further in communication with the fail timer.

4. The clutch-to-clutch transmission monitoring system for an automobile vehicle of claim 3, wherein following a predetermined period of time of operation of the fail timer the post-compute monitor issues a fail command to the HWIO module to cease operation of the at least one component.

5. The clutch-to-clutch transmission monitoring system for an automobile vehicle of claim 1, wherein the monitor defines a command shift monitor monitoring for an unintended vehicle deceleration due to an engine over speed caused by achieving a gear that is too low for a current vehicle speed.

6. The clutch-to-clutch transmission monitoring system for an automobile vehicle of claim 5, wherein the pre-compute monitor determines allowed operating thresholds of a lowest allowed gear based on a driver request and incorporates the allowed operating thresholds when generating the operating threshold signal.

7. The clutch-to-clutch transmission monitoring system for an automobile vehicle of claim 1, wherein the monitor defines a ratio monitor monitoring for an incorrect direction of the vehicle as the vehicle begins to move from a stopped position.

8. The clutch-to-clutch transmission monitoring system for an automobile vehicle of claim 7, wherein the pre-compute monitor validates a transmission is configuring for either reverse or forward through the use of a calculated signed ratio.

9. The clutch-to-clutch transmission monitoring system for an automobile vehicle of claim 1, wherein the monitor defines a tie-up monitor monitoring for an unintended vehicle deceleration due to extra clutches being commanded on when the extra clutches should be off.

10. The clutch-to-clutch transmission monitoring system for an automobile vehicle of claim 9, wherein:
- if a transmission defines an auto-planetary transmission, the pre-compute monitor identifies if any normally OFF clutch for a desired gear is indicating ON, indicating a tie-up condition is present; or
- if the transmission defines a dual clutch transmission, the pre-compute monitor confirms that each of two clutches are not both ON all the time.

11. The clutch-to-clutch transmission monitoring system for an automobile vehicle of claim 1, wherein the monitor defines a range monitor monitoring for an incorrect vehicle direction command.

12. The clutch-to-clutch transmission monitoring system for an automobile vehicle of claim 11, wherein the pre-compute monitor identifies allowed clutch combinations based on a PRNDL position via clutch connectivity detection.

13. A clutch-to-clutch transmission monitoring system for an automobile vehicle, comprising:
- a control software receiving input data from multiple systems of the automobile vehicle and generating a control signal;
- a monitor in communication with the control software;
- a pre-compute monitor in communication with the control software, the pre-compute monitor also receiving the input data and outputting an operating threshold signal to the control software, the operating threshold signal defining allowed operating bounds for at least one transmission component in communication with the monitor;
- software checks added to the control software determining thresholds identified by the operating threshold signal determined by the pre-compute monitor are not violated;
- a post-compute monitor receiving both the control signal and the operating threshold signal, the post-compute monitor comparing the control signal to the operating threshold signal to identify if the control signal violates the allowed operating bounds defined by the pre-compute monitor; and
- a fail timer initiated by the post-compute monitor when the control signal violates the allowed operating bounds defined by the pre-compute monitor.

14. The clutch-to-clutch transmission monitoring system for an automobile vehicle of claim 13, wherein the pre-compute monitor includes a calibration monitor for performing vehicle speed and allowable gear calculations.

15. The clutch-to-clutch transmission monitoring system for an automobile vehicle of claim 14, further including a memory, wherein calculations performed in the calibration monitor of the pre-compute monitor are saved in the memory.

16. The clutch-to-clutch transmission monitoring system for an automobile vehicle of claim 13, wherein the monitor includes one of a command shift monitor, a ratio monitor, a tie-up monitor, and a range monitor.

17. A clutch-to-clutch transmission monitoring system for an automobile vehicle, comprising:
- a control software receiving input data from multiple systems of the automobile vehicle and generating a control signal;
- a monitor in communication with the control software;
- a pre-compute monitor in communication with the control software, the pre-compute monitor also receiving the input data and outputting an operating threshold signal to the control software, the operating threshold signal defining allowed operating bounds for at least one transmission component in communication with the monitor;
- a post-compute monitor receiving both the control signal and the operating threshold signal, the post-compute monitor comparing the control signal to the operating threshold signal to identify if the control signal violates the allowed operating bounds defined by the pre-compute monitor;
- a fail timer initiated by the post-compute monitor when the control signal violates the allowed operating bounds; and
- a hardware inputs and outputs (HWIO) module in communication with the fail timer opens drivers to multiple clutches when a fail signal is generated by the post-compute monitor following a predetermined period of time of operation of the fail timer.

18. The clutch-to-clutch transmission monitoring system for an automobile vehicle of claim 17, further including:
- a calibration monitor for performing vehicle speed and allowable gear calculations; and
- a memory, wherein calculations performed in the calibration monitor are saved in the memory.

19. The clutch-to-clutch transmission monitoring system for an automobile vehicle of claim 18, wherein the calibration monitor is included with the pre-compute monitor.

* * * * *